United States Patent Office 3,230,196
Patented Jan. 18, 1966

3,230,196
THERMALLY STABLE POLYBENZOXAZOLES
Wendell W. Moyer, Jr., Parkersburg, W. Va., assignor to Borg-Warner Corporation, Chicago, Ill., a corporation of Illinois
No Drawing. Filed Aug. 6, 1962, Ser. No. 214,838
7 Claims. (Cl. 260—47)

This invention relates to novel polybenzoxazole polymers and more particularly to high molecular weight linear aromatic polybenzoxazoles.

Since their discovery, linear polymers such as the polybenzimidazoles and aliphatic polybenzoxazoles have found increased utility as tough, wear-resistant polymers with high softening points, low water adsorption, and good weatherability. The aliphatic polybenzoxazoles, such as those described in U.S. Patent No. 2,904,537 issued to Keith Clarke Brinker et al., September 15, 1959, are exemplary of those aliphatic polymers that exhibit good physical and chemical properties. The polybenzimidazole polymers also demonstrate excellent stiffness at relatively high temperatures.

The search for improved polymers with higher stiffness and toughness as well as water and oxygen resistance resulted in research being conducted on compounds containing aromatic groups in an attempt to provide a polymer with conjugated aromatic groups therein. The present invention provides novel polymers that are characterized by outstanding thermal stability, high softening points, low water adsorption, along with stiffness at relatively high temperatures and excellent ultraviolet adsorption. The aromatic polymers of the present invention are superior to the prior linear polybenzimidazoles and polybenzoxazole polymers above described, inasmuch as the aromatic units in the polymer chain causes the polymer to exhibit properties heretofore unobtainable in an aliphatic polymer system.

Generally stated, this invention provides aromatic polybenzoxazole polymers obtained by the condensation of amino-hydroxybenzoic acids and by the condensation of bis(o-amino-phenols) and aromatic dicarboxylic acids or their derivatives. The condensation of the aminohydroxybenzoic acids is shown in Equation 1 below, and the condensation of bis(o-amino-phenols) with aromatic dicarboxylic acids and/or their derivatives is shown in Equation 2 below:

EQUATION 1

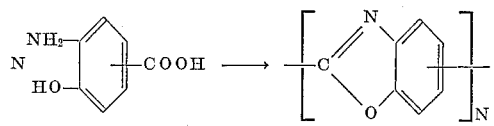

EQUATION 2

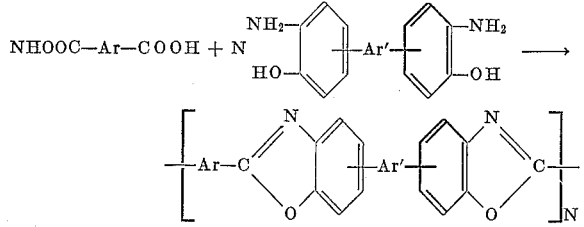

wherein the carboxyl group in Equation 1 may be in the p or m position on the benzene ring in relation to the amino group and wherein the Ar in Equation 2 is a divalent aromatic hydrocarbon radical and Ar' is either divalent aromatic hydrocarbon radical or carbon-to-carbon diphenyl bond.

The amino-hydroxybenzoic acid monomer in Equation 1 is obtained by nitration of p and/or m hydroxybenzoic acids followed by reduction of the nitro derivative.

The aromatic dicarboxylic acids or their derivatives, such as the esters thereof, used to form the polybenzoxazole as shown in Equation 2 are generally derivatives of aromatic dicarboxylic acids of the formula—

Formula A

wherein Ar is aromtic hydrocarbon radical. The phenyl esters are preferred, due to the ease with which they are combined with the bis(o-amino-phenol) monomer.

The bis(o-amino-phenols) used to prepare the polybenzoxazole of Equation 2 have the following formula—

Formula B

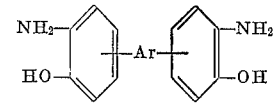

wherein Ar may be a divalent aromatic hydrocarbon radical or Ar may be a benzene ring carbon-to-benzene ring carbon bond.

The invention is further illustrated by the following examples, in which parts are by weight unless otherwise indicated.

EXAMPLE I.—PREPARATION OF POLY(2,5-BENZOXAZOLE)

Five g. of 3-amino-4-hydroxybenzoic acid and 25 ml. of thionyl chloride were heated under reflux for three hours—hydrogen chloride and sulfur dioxide were then evolved. The excess thionyl chloride was removed by vacuum stripping. A yellow residue formed and was taken up in 25 ml. of benzene and slowly added to a solution of 3.5 g. of phenol and 3.0 g. of pyridine in 25 ml. of benzene. The mixture was refluxed for one hour; and a brown precipitate formed which was filtered and washed with benzene, then water, giving a bright yellow material upon drying. The yield was 3.3 g. The precipitate did not melt below 300° C. This material was charged to a side-arm test tube, flushed with nitrogen, and heated 16 hours at 270° C. under a slow stream of nitrogen. The product, a light brown powder, had an inherent viscosity of 1.04 in concentrated sulfuric acid (.2 percent solutions, 25° C.). A larger run, using 20 g. of monomer, gave 10.4 g. (83.5 percent) poly(2,5-benzoxazole) with an inherent viscosity of 0.65. These polymers were characterized by infrared and ultraviolet absorption spectra. The ultraviolet spectrum of the respective polymers in sulfuric acid showed a broad maxima at 379 mu and had a specific absorptivity of 156. Two tared side-arm test tubes were charged respectively with approximately .5 g. of the higher molecular weight (1.04) intrinsic viscosity poly(2,5-benzoxazole) and 0.5 g. of the lower molecular weight (.65) intrinsic viscosity poly(2,5-benzoxazole); in each case the polymer was flushed with nitrogen for one-half hour, heated at 300° C. for one hour, cooled, and weighed. The respective tubes were then heated for a one-hour period at each of four temperatures, i.e., 400°, 450°, 500°, and 550° C. under a slow stream of preheated nitrogen, the weight being taken after each period. Percent weight losses shown were computed from the polymer weight at 300° C. The higher molecular weight (intrinsic viscosity 1.04) 2,5-isomer lost five percent after heating successively for one hour each at 400°, 450°, 500°, and 550° C.; and the lower molecular weight (intrinsic viscosity .65) lost five percent after 400° C. treatment and a total of 15 percent after the 450°, 500°, and 550° C. heating periods.

EXAMPLE II.—PREPARATION OF POLY(2,6-BENZOXAZOLE

Using the same procedure as in Example I, poly(2,6-benzoxazole) was prepared from 4-amino-3-hydroxybenzoic acid and gave an inherent viscosity of .22 in sulfuric acid. This polymer was also light brown in color and was characterized by infrared and ultra-violet absorption spectra. The ultraviolet spectrum in sulfuric acid showed a broad maxima at 375 mu and had a specific absorptivity of 130. The thermal stability of the 2,6-isomer was obtained as in Example I and lost five percent after 400° C. treatment and a total of 15 percent after the 450°, 500° and 550° C. heating periods.

EXAMPLE III.—ISOPHTHALATE POLYBENZOXAZOLE PREPARED BY COPOLYMERIZATION OF 3,3'-DIHYDROXYBENZIDINE WITH DIPHENYL ISOPHTHALATE 3,3'-dihydroxybenzidine, 2.162 g. (0.010 mole) and 3.183 g. (0.010 mole) diphenyl isophthalate were carefully ground together in a mortar and transferred quantitatively to a small side-arm test tube fitted with a nitrogen bubble tube. The tube was flushed for one hour with dry, oxygen free nitrogen. A slow stream of nitrogen was thereafter maintained during the course of the reaction. The tube was suspended in a Woods metal bath and heated slowly to 370° C. over a 75 minute period and allowed to cool gradually to 300° C. over a 70 minute period. During the reaction the mass softened, resolidified, and turned yellow in color. Both phenol and water were expelled easily during the reaction. The reaction mass was heated an additional four hours at between 300° C. and 320° C. A yield of 3.10 g. (100 percent) of yellow colored brittle resin was obtained. The polymer was completely soluble in sulfuric acid and partially soluble in trifluoroacetic acid. The polymer had an inherent viscosity of 0.43 (0.4 g./100 ml. $H_2SO_4$, 25° C.). The infrared spectrum was in agreement with the proposed structure. X-ray analysis indicated that the product was crystalline. The ultraviolet spectrum of the polymer in sulfuric acid showed maxima at 350 mu and a specific extinction coefficient of 73.5. The polymer was nonflammable, and during the thermal stability test it lost 13.4 percent by weight after five successive one-hour heating periods at 300°, 400°, 450°, 500°, and 550° C.

EXAMPLE IV.—TEREPHTHALATE POLYBENZOXAZOLE PREPARED BY COPOLYMERIZATION OF 3,3'-DIHYDROXYBENZIDINE WITH DIPHENYL TEREPHTHALATE

A ground mixture of 1.693 g. (0.0078 mole) 3,3'-dihydroxybenzidine and 2.492 g. (0.0078 mole) diphenyl terephthalate was charged to a small side-arm test tube fitted with a nitrogen bubble tube. The mixture was flushed with dry, oxygen free nitrogen for a period of one hour prior to reaction, and a slow stream of nitrogen was maintained during the entire course of the polymerization. The tube was suspended in a Woods metal bath and gradually heated to 300° C. over a two-hour period. The temperature was maintained at between 300° C. and 330° C. for a further period of four hours. The reaction mixture changed in color from gray to pale cream, which then darkened during the course of the polymerization. Both phenol and water were expelled readily during the early stages. At no time did the reaction mass become molten. A yield of 2.42 g. (100 percent) of brittle, rust colored resin was obtained. The product was 55 percent soluble in concentrated sulfuric acid and had an inherent viscosity of 0.94 (0.25 g./100 ml. $H_2SO_4$, 25° C.). The infrared spectrum was in agreement with the suggested structure. The ultraviolet spectrum of the polymer in sulfuric acid showed broad maxima at 390 mu and had a specific extinction coefficient of 35.0. The polymer was nonflammable in an open flame. During the thermal stability test, the polymer lost 12.65 percent by weight after four successive one-hour heating periods at 300°, 450°, 500°, and 550° C.

EXAMPLE V.—5-CHLOROISOPHTHALATE POLYBENZOXAZOLE PREPARED BY COPOLYMERIZATION OF 3,3'-DIHYDROXYBENZIDINE WITH DIPHENYL 5-CHLOROISOPHTHALATE

A ground mixture of 2.162 g. (0.010 mole) 3,3'-dihydroxybenzidine and 3.538 g. (0.010 mole) diphenyl-5-chloroisophthalate was charged to a small side-arm test tube fitted with a nitrogen bubble tube. The mixture was flushed with dry, oxygen free nitrogen for a one-hour period prior to reaction, and a slow stream of nitrogen was maintained during the entire course of the polymerization. The tube was suspended in a silicone oil bath and gradually heated to 240°–270° C. for a period of 19 hours. The reaction mixture was molten between 133° C. and 240° C., and it gradually changed to a yellow powder. Both phenol and water were easily expelled during the early stages. The polymer gradually darkened from yellow to brown during the reaction. A yield of 3.60 g. (104.3 percent) of brown powder was obtained. The product was 76 percent soluble in concentrated sulfuric acid and had an inherent viscosity of 0.25 (0.2 g./100 ml. $H_2SO_4$, 25° C.). The infrared spectrum agreed with the proposed structure. The ultraviolet spectrum of the polymer in sulfuric acid showed broad maxima at 236 mu and had a specific absorptivity of 106.35. During the thermal stability test the polymer lost 15.1 percent by weight after three successive one-hour heating periods at 350°, 500°, and 550° C.

The polybenzoxazoles of this invention may be modified by copolymerization. It is also possible to use more than one aromatic dicarboxylic acid in the condensation with the bis(o-amino-phenols). Similarly, more than one bis(o-amino-phenol) compound may be used in the polycondensation. In the polycondensation of the aminohydroxybenzoic acid monomers, the carboxyl group may be para to the amino group or para to the hydroxyl group, thus mixed hydroxybenzoic acids may be used in the polymerization.

The properties of the aromatic polybenzoxazoles make these condensation polymers extremely valuable for high temperature applications. They will also find use as semiconductors, dies, and ultraviolet absorbers. The completely conjugated aromatic structure of the polymers in the present invention causes the polymers to exhibit properties that cannot be compared with the properties of polymers having aliphatic structural units therein.

Although the invention has been described in detail with particular reference to certain preferred embodiments thereof, variations and modifications can be effected within the spirit and scope of the invention as described hereinabove and as defined in the appended claims.

I claim:

1. A normally solid, aromatic polybenzoxazole having an inherent viscosity in excess of 0.2 measured in sulfuric acid at 25° C. comprising recurring structural units of the class consisting of—

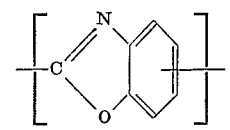

and—

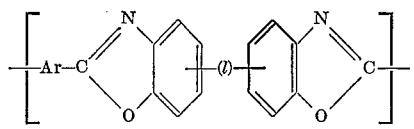

wherein Ar is a divalent aromatic hydrocarbon radical and (l) is selected from the group consisting of divalent aromatic hydrocarbon radicals and benzene ring carbon-to-benzene ring carbon bonds.

2. A normally solid, aromatic polybenzoxazole having an inherent viscosity in excess of 0.2 measured in sulfuric acid at 25° C. comprising recurring structural units of the formula—

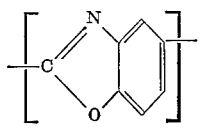

3. A normally solid, aromatic polybenzoxazole having an inherent viscosity in excess of 0.2 measured in sulfuric acid at 25° C. comprising recurring structural units of the formula—

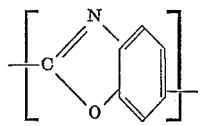

4. A normally solid, aromatic polybenzoxazole having an inherent viscosity in excess of 0.2 measured in sulfuric acid at 25° C. comprising recurring structural units of the formula—

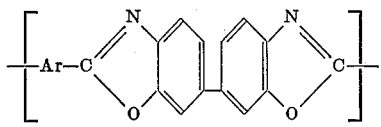

5. The process of preparing polybenzoxazoles which consists of heating in the absence of oxygen at reflux temperature benzoxazole forming compounds from the class consisting of amino-hydroxybenzoic acids of the formula—

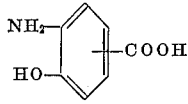

in the presence of thionyl chloride to cause precipitate to form in solution and heating the precipitate at about 270° C. for about 16 hours to thereby provide a high molecular weight polybenzoxazole.

6. The process of preparing polybenzoxazoles which consists of heating, in the absence of oxygen at a temperature of between 300° C. and 370° C., benzoxazole forming compounds selected from the class consisting of bis(o-amino-phenols) having the general formula—

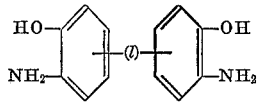

and aromatic dicarboxylic acids having the general formula—

HOOC—Ar—COOH wherein Ar is a divalent aromatic hydrocarbon radical and wherein ($l$) is selected from the group consisting of divalent aromatic hydrocarbon radicals and diphenyl benzene ring carbon-to-benzene ring carbon bonds.

7. A normally solid, aromatic polybenzoxazole having an inherent viscosity in excess of 0.2 measured in sulfuric acid at 25° C. comprising recurring structural units of the formula—

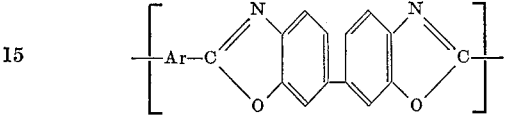

formed by the polycondensation of derivatives of aromatic dicarboxylic acids of the formula—

HOOC–Ar–COOH wherein Ar is a divalent aromatic hydrocarbon radical with bis(o-amino-phenols) of the formula—

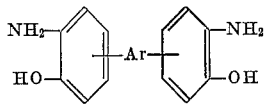

wherein Ar is selected from the group consisting of divalent aromatic hydrocarbons and benzene ring carbon-to-benzene ring carbon diphenyl bonds.

References Cited by the Examiner
UNITED STATES PATENTS 2,895,948 7/1959 Brinker et al. _____ 260—78.4
2,904,537 9/1959 Brinker et al. _____ 260—78

OTHER REFERENCES

Marvel, WADD Technical Report 61–12, High Polymeric Materials, pp. 72–97, pp. 72–75 relied on, April 1961.

Vogel et al., J. Polymer Science, vol. 50, pp. 511–539, April 1961.

Kubota et al., J. Polymer Science (Polymer Letters), Part B, vol. 2, pp. 655–659, June 1964.

WILLIAM H. SHORT, *Primary Examiner.*